MAGNETIC RECORDING HEADS UTILIZING SYMMETRICAL WINDINGS TO AVOID CROSS TALK

Filed Oct. 12, 1962 2 Sheets-Sheet 1

PRIOR ART MAGNETIC READ WRITE HEAD ARRANGEMENT

CROSSTALK CANCELING MAGNETIC HEAD ASSEMBLY

ASSEMBLY USING COMMON RETURN PIECE

INVENTOR.
VINCENT J. PORTER
BY
Robert D. Santon
ATTORNEY

FLUX PATHS DUE TO WRITE CURRENT (i) IN WRITE WINDING IN SINGLE GAP HEAD

FLUX PATHS THRU HEAD WHEN READING FROM MAGNETIC MEDIUM IN SINGLE GAP HEAD

FIG. 6. ALTERNATE MANNER OF WINDING DRIVE COIL ON WRITE HEAD

FIG. 7. ALTERNATE CORE AND WINDING CONFIGURATION

INVENTOR.
VINCENT J. PORTER
BY Robert D. Sanborn
ATTORNEY

United States Patent Office 3,287,713

Patented Nov. 22, 1966

3,287,713

MAGNETIC RECORDING HEADS UTILIZING SYMMETRICAL WINDINGS TO AVOID CROSS TALK

Vincent J. Porter, Quakertown, Pa., assignor to Philco Corporation, Philadelphia, Pa., a corporation of Delaware Filed Oct. 12, 1962, Ser. No. 230,039
5 Claims. (Cl. 340—174.1)

SUMMARY

Figure 1:
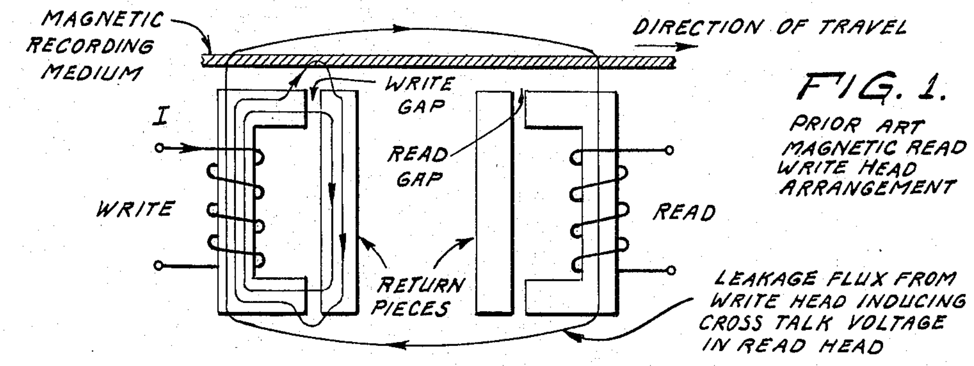

A recording head which induces no crosstalk voltages in adjacent heads or read windings on the same head structure is the subject of this invention.

Absence of crosstalk voltage stems from the fact that the core of the head is symmetrical with a winding symmetrically wound thereon so that flux from the recording head assumes a symmetrical configuration, thereby inducing equal and opposite self cancelling voltages in the halves of a symmetrically placed adjacent read winding.

INTRODUCTION

In the magnetic recording head art, problems have arisen because of voltages induced in adjacent read windings due to the flux produced by write windings. Leakage flux from the write magnetic circuit or the main flux of the write circuit itself may cause difficulties, depending on the type of head assembly used.

*Leakage flux*

Problems with leakage flux arise, for instance, when digital information is recorded on magnetic media and a head is arranged to read the recorded information immediately after recording as a check on the accuracy of the recording process. Check reading is accomplished by placing a read head adjacent the magnetic medium near the record or write head so that the recently recorded information may be picked up and fed to circuitry where it is analyzed for errors.

It is desirable to place the read head very close to the write head as measured on the recorded track in order to detect recording errors as soon as possible. A present existing limitation on the degree of closeness of write and read heads results from the crosstalk which the leakage flux from the write head induces in the read head. Magnetic shielding arrangements, as exemplified, for instance, in the patent to Witt et al., No. 2,922,231, Jan. 26, 1960, have been used between the read and write heads to block this leakage flux, but such shields are somewhat clumsy, not entirely effectual and are designed to suppress an existing problem rather than eliminate it.

*Main flux*

Limitations also arise in conjunction with single gap read-write recording heads due to the main flux produced by the write magnetic circuit. At present a single winding is used in single gap read-write heads with appropriate switching means to connect the output terminals of the winding to the output of the write amplifier or to the input of the read amplifier according to the operation desired. Dual windings permanently connected to their respective amplifiers cannot be used because of the problem of mutual coupling between the windings; energy from the write amplifier would be coupled into the sensitive read amplifier during recording.

Drawbacks of the present single winding system arise because the necessary switching means are expensive, require control signals, and produce a switching delay.

It would be desirable if a write head could be produced whose flux induces no voltage in adjacent read windings, whether the read winding be part of an adjacent head, or part of the same head. The present invention relates to such a write head, the flux produced thereby being innocuous because it assumes symmetrical paths and thus induces only self-cancelling voltages in adjacent read windings.

Figure 2:
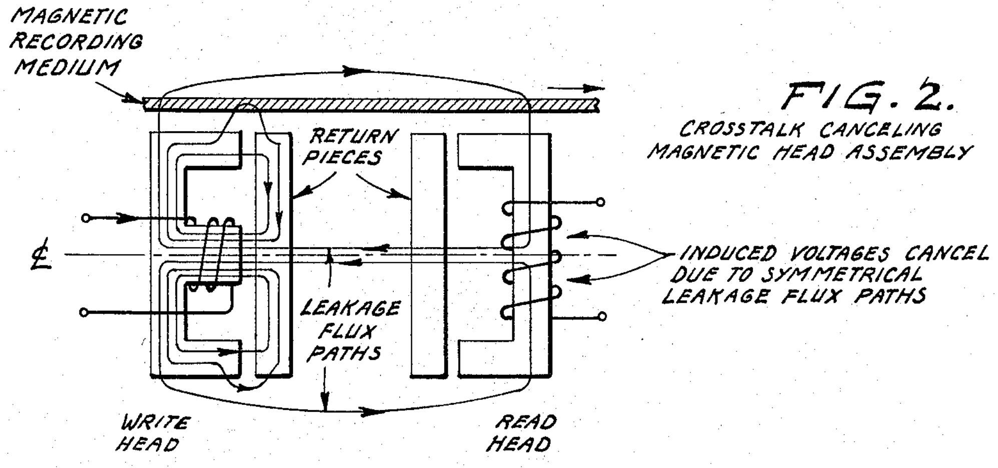
Figure 3:
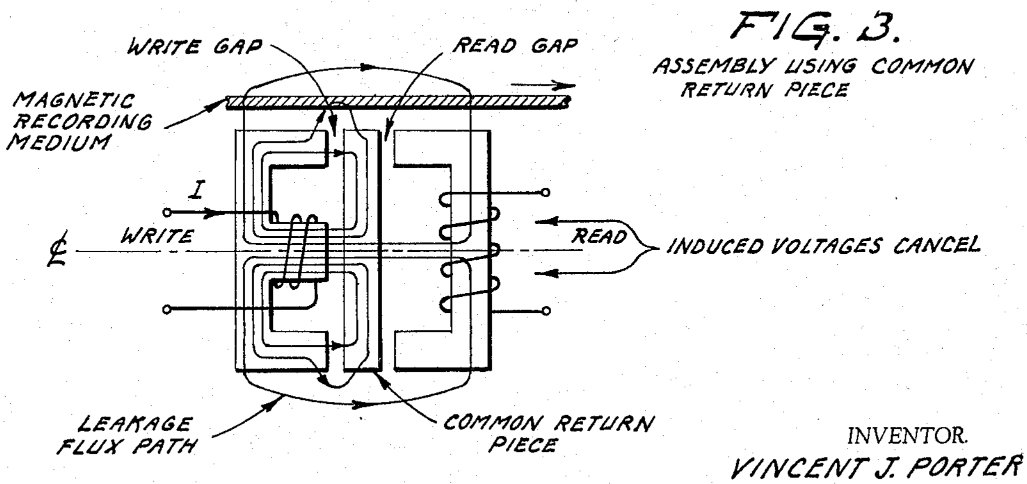
Figure 4:
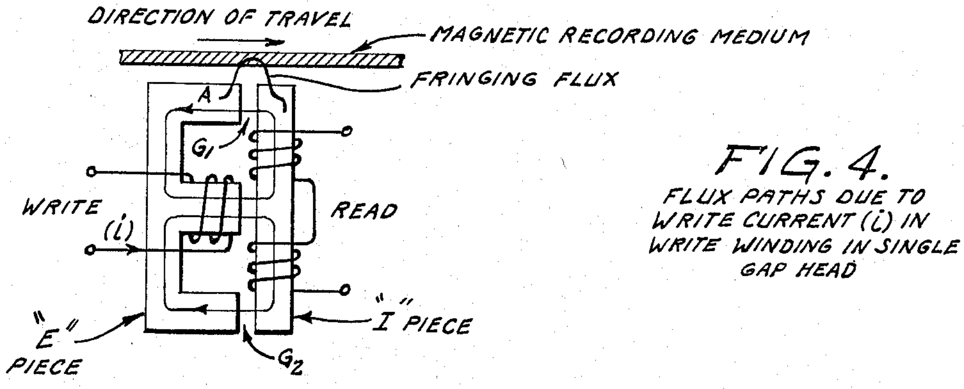
Figure 5:
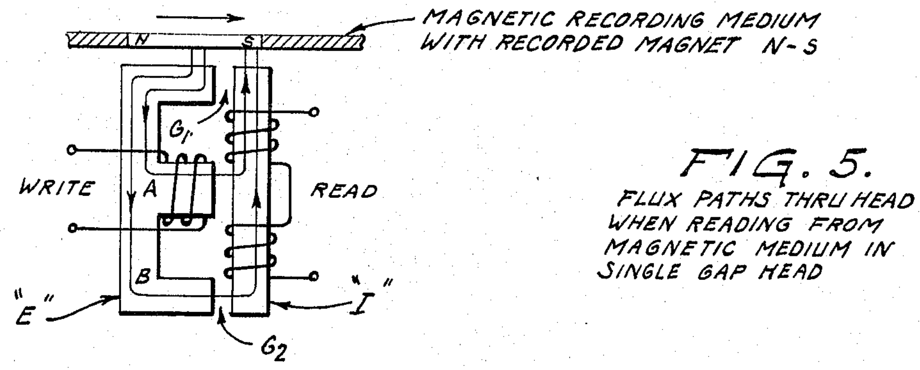
Figures 6, 7:
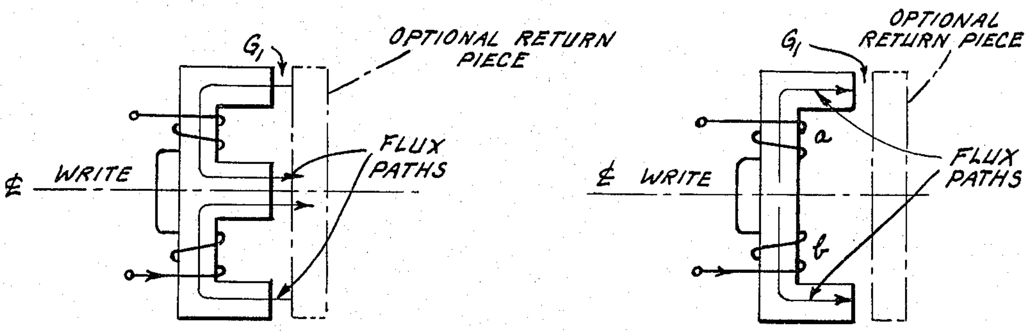

Drawings:

The invention is depicted in the several figures of drawing wherein:

FIG. 1 shows a prior art read-write head arrangement having an undesirable crosstalk problem, FIG. 2 shows the same arrangement using the write head of the invention, FIG. 3 shows how the invention permits the same magnetic return path to be used for both heads, FIGS. 4 and 5 show a single gap read-write head using the principle of the invention, and FIGS. 6 and 7 show ramifications of the invention.

FIGURE 1.—PRIOR ART

A typical prior art read-write head arrangement is illustrated in FIG. 1. The flux from the write gap in the write head passes through the moving magnetic recording medium as shown to store information therein. Said medium may be a magnetic tape, drum, disc, etc. The read head senses the information recently stored in the write head and produces an output signal on the read coil conforming to such information. However, spurious signals are also induced in the read head by the leakage flux from the write head as shown. A barrier of low-reluctance material placed between read and write heads will block some of this leakage flux and thus reduce the volume of the induced spurious signals to a degree, but some leakage flux will always travel around such a barrier, especially on the side of the recording medium where no shield can be placed.

FIGURE 2

Substitution of the write head of the invention for the prior art write head yields the arrangement shown in FIG. 2 wherein no net spurious signals are induced in the read head winding due to the symmetrical nature of the leakage flux.

More particularly, it is seen that the core of the write head of the invention is symmetrically E-shaped with the drive coil wound on the center leg thereof. Flux induced by the write current flowing in the coil travels from the center leg around through the end legs, through the equal gaps, one of which is the write gap, through the halves of the return piece and thence back to the center leg. The leakage flux paths, as shown, are symmetrical about the center line, and hence induce equal but opposing voltages in the output coil of the read head, whereby no net spurious output voltage appears in the read winding. It is important, in order to eliminate induced voltages due to leakage flux, that the write head and its return piece be symmetrical, that the gaps therein be equal, and that the coil be symmetrically positioned on the read head. In this way equal and opposite voltages will be induced in the read head.

FIGURE 3.—COMMON RETURN PIECE

Because of the innocuous nature of the leakage flux produced by the write head of the invention, the read head may be placed as close as desired thereto without inducing crosstalk voltages therein. It is thus practical to use the same return piece for both read and write heads as shown in FIG. 4. This arrangement enables the distance between read and write gaps to be reduced to an absolute minimum, and in addition eliminates one assembly component.

FIGURES 4 AND 5.—SINGLE GAP READ-WRITE HEAD

If a read winding is wound on the write head of the invention as shown in FIGS. 4 and 5, a single gap, two-winding, read-write head results which requires no switches to change from a write to a read function.

Due to the configuration of the write head of the present invention, a read winding can be wound on the same core structure without generating an output voltage when the write winding is activated. Thus reading can take place instantly upon cessation of writing since the read winding can always be directly connected to the input of its associated amplifier without feeding write energy thereinto.

The read winding is symmetrically wound on the "I" piece as shown in FIG. 4. The flux from the write winding threads the read winding in equal and opposite directions, thereby inducing equal and opposite crosstalk voltages, but no net output voltage in the read winding during writing. The head is constructed symmetrically so that the reluctance of flux path A, including gap G1 (the read-write gap), is the same as the reluctance of flux path B, which includes gap G2. The fringing flux around G1 is used for writing in the magnetic medium which is placed adjacent G1.

FIG. 5 shows how flux is induced in the head when the write current has been shut off, and flux from a magnetized spot on the recording medium (represented by magnet N–S) is threading the head in reading. The flux forms two loops, A and B, through the E and I pieces as shown. These fluxes thread the two parts of the read coil in similar directions giving rise to voltages of different magnitudes, but similar sign. The sum of these voltages appears at the terminals of the read winding, which in practice would always be connected to the input of the read amplifiers.

It should be noted that if the functions of the windings be interchanged (i.e., the winding on the E piece may be used as a read winding and the winding on the I piece may be used as a write winding), the head will perform in the same way with respect to absence of crosstalk and intercoupling between windings.

FIGURE 6.—ALTERNATE WINDING CONFIGURATION

It will be apparent that symmetrical leakage flux paths, identical to those shown in FIGS. 2 and 3, will also be produced if the drive winding is symmetrically wound about the two end legs of the E-shaped write core as shown in FIG. 6. The segments of the winding on each end leg of the E core should be symmetrical with respect to the symmetrical axis of the core in order to create symmetrical flux paths.

FIGURE 7.—ALTERNATE CORE AND WINDING CONFIGURATION

The invention is not limited to an E-shped core since symmetrical flux paths will also be produced by the symmetrical winding configuration shown in FIG. 7. A C-shaped core is shown, but an I-shaped core (with a C-shaped return piece) can be used also. The absence of a center leg in this configuration will cause the opposing flux paths to buck each other in the core, decreasing the head efficiency. A magnetizing flux will still be produced in gap G1, however, since the gap is closer to winding A than winding B. The ramifications of FIGS. 6 and 7 may be used in any of the embodiments of FIGS. 2 or 5. A return piece is not a necessary component in any of the embodiments or ramifications; it is used only to increase head efficiency.

The instant invention is not limited to the specific features of above description since many modifications thereof which fall within the true scope of the inventive concept will be apparent to these conversant with the art. The invention is defined only by the appended claims.

I claim:

1. A read-write magnetic head comprising a magnetic core including an E-shaped section and I-shaped section spaced from the ends of the legs of said E-shaped section so as to create three magnetic gaps, a drive winding wound on said magnetic core so as to create magnetic flux paths in the center and end legs of said E-shaped section, the flux in each of said end legs being substantially equal and travelling in the same direction with respect to said center leg so that the flux value in said center leg is substantially twice the magnitude of the flux in each of said end legs, and a read winding wound on said I-shaped section of said magnetic core so that the flux paths from said drive winding induce equal but opposite and hence self-canceling voltages in said read winding.

2. The head of claim 1 wherein said write winding is wound on the center leg of said E-shaped section.

3. The head of claim 1 wherein said write winding is wound in two coils on the end legs of said E-shaped section.

4. A read-write head comprising a magnetic core including an E-shaped section and an I-shaped section spaced from the ends of the three legs of said E-shaped section, a drive winding on the center leg of said E-shaped section so as to create three magnetic gaps, and a read winding on said I-shaped section, equal halves of said read winding being positioned about the axis of the center leg of said E-shaped section so that flux from said drive winding can induce no net voltage in said read winding.

5. A read-write head comprising a magnetic core including an E-shaped section and an I-shaped section spaced from the ends of the three legs of said E-shaped section so as to create three magnetic gaps, a drive winding wound in two coils on the respective end legs of said E-shaped section, said coils being wound so that the respective flux paths therefrom will cumulate in the center leg of said E-shaped section, and a read winding on said I-shaped section, equal halves of said read winding being positioned about the axis of the center leg of said E-shaped section so that flux from said drive winding can induce no net voltage in said read winding.

References Cited by the Examiner

UNITED STATES PATENTS

| | | | |
|---|---|---|---|
| 2,496,441 | 2/1950 | Camras | 179—100.2 |
| 2,633,504 | 3/1953 | Beer | 179—100.2 |
| 2,803,708 | 8/1957 | Camras | 179—100.2 |
| 2,846,517 | 8/1958 | Farrand et al. | 179—100.2 |
| 2,969,529 | 1/1961 | Gilson | 179—100.2 |
| 3,102,170 | 8/1963 | De Koning | 179—100.2 |
| 3,114,011 | 12/1963 | Shirakura | 179—100.2 |
| 3,187,111 | 6/1965 | Smaller | 179—100.2 |

References Cited by the Applicant

UNITED STATES PATENTS 3,107,347 10/1963 Huss.

BERNARD KONICK, *Primary Examiner.*

IRVING L. SRAGOW, *Examiner.*

F. C. WEISS, T. W. FEARS, *Assistant Examiners.*